United States Patent Office 3,136,783
Patented June 9, 1964

3,136,783
POLYETHER POLYNITRILES AND POLYETHER POLYAMINES
Russell J. Stenberg, St. Paul, and Alfred E. Rheineck, Minneapolis, Minn., assignors to Archer-Daniels-Midland Company, Minneapolis, Minn., a corporation of Delaware
No Drawing. Filed Oct. 30, 1957, Ser. No. 693,272
4 Claims. (Cl. 260—338)

This invention relates to polyether-polynitrile and polyether-polyamine compounds and their method of preparation. More particularly the invention relates to viscous polyether-polynitrile and viscous-polyether polyamine compounds derived from viscous polymers of polyether-polyesters and polyether-polyacids obtained by polymerization of epoxy esters of long chain fatty acids, of either natural or synthetic sources. More specifically, the epoxidized esters prepared from non-conjugated drying, semi-drying and non-drying oils, and their fatty acids and compounds derived from petroleum sources, are polymerized through the oxygen of an epoxy group or groups and the polyether polymers are then sparged with ammonia in the presence of a catalyst to obtain the corresponding nitrile, followed by hydrogenation to obtain the polyether polyamine.

There is described in the co-pending application of Walter M. Budde, Ser. No. 624,725, new compounds as polyether polyesters and polyether polyacids in the viscous and gel state including the preparation thereof from mono-epoxy esters and particularly long chain mono-epoxy fatty acid esters derived from animal, vegetable and marine oils. Such viscous polyether polyesters, as described therein, are the preferred starting materials for the new compounds described herein. The compounds of the present invention can be illustrated and exemplified by indicating the nitrile preparation from a typical polyether-polyester and hydrogenation of polyether-polynitrile to obtain a polyether-polyamine as hereinafter set forth. As expressed herein the polymer chains are in multiple units greater than 1 and, as indicated in the above application, in repeating units of not more than about 12.

Accordingly, it is an object of this invention to prepare nitriles by reaction of ammonia with a polyether-polyacid or a polyether-polyester, said polyether products being the polymerization products of long chain epoxidized fatty acids and esters.

It is an object of this invention to prepare nitriles by the reaction of ammonia and a nitrile forming catalyst with polyether-polyacids or polyether-polyesters in the liquid phase.

It is still another object of this invention to prepare new polyamines from polyether-polyacids or polyether-polyesters.

The viscous polyether-polyester or polyether-polyacid products described in the Budde application and which serve as the starting compounds of the present disclosure, can be shown by the empirical formula, $$(M'COOR)_n$$

wherein M' represents multiple and repeating units of a fatty chain derived material having 7–25 carbon atoms, in each starting unit and preferably 9–21 carbon atoms, connected in repeating units through an ether oxygen. R is hydrogen, preferably a short chain alkyl group from methyl to octyl, or an aryl group and $n$ is a number greater than 1.

Various source polymers of the character herein described may be indicated as polymerized mono-epoxy esters such as methyl 9,10-epoxystearate; methyl mono-epoxystearate copolymerized with epoxidized methyl esters of soybean acids or other epoxidized esters of vegetable, animal and marine fatty acids; butyl 9,10-epoxystearate copolymerized with epoxidized tallow, tall oil and sperm oil; polymerized methyl epoxypalmitate; polymerized methyl epoxy behenate; polymerized methyl epoxy laurate; copolymers of the mono-epoxy compounds with poly-epoxy compounds as butyl 9,10-12,13 diepoxystearate, and other epoxy ester derivatives of vegetable, animal and marine acids. It will be understood that the above are examples only of mono- and poly-epoxy esters obtained from animal, vegetable and marine oils including tallow, menhaden, sardine, sperm, cottonseed, sunflower, linseed, corn, peanut, soybean, sesame and the like. It is the preferred viscous polymers formed by these non-limiting illustrative ester compounds which are source compounds for the viscous polyether-polynitrile and polyether-polyamine products of this disclosure. The polyether-polyacids are found to form gels upon conversion to nitriles.

Other particular polyether-polyester and polyether-polyacid starting materials may be derived from synthetic and petroleum sources. The utility of basic compounds derived from sources other than vegetable, animal and marine oils rests in the presence of an ethylenic group which can be converted to the oxirane structure by any conventional method. Some typical base acids are those acids derived from olefin polymerization followed by the introduction of the carboxyl group by conventional methods of synthesis.

The method by which the polymerized epoxy compounds are converted to the final products of this disclosure are shown empirically, thus;

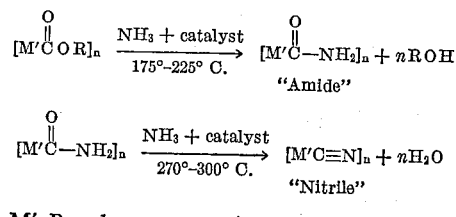

where M', R and $n$ are as previously defined.

We prefer to react the polyester with ammonia in the presence of catalyst at the higher temperature as described above to directly give the nitrile as the product.

Further, the polyether polyammonium soap as described in the indicated co-pending application can be used in lieu of the polyether-polyester or polyether-polyacid, thus;

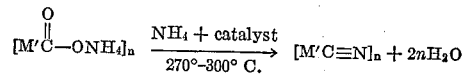

From the nitrile products of the above illustration, the production of polyether-polyamines can be illustrated empirically, as follows:

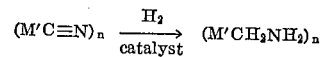

The repeating unit, M', may be illustrated further as having valences connected through a break of the oxirane structure as follows:

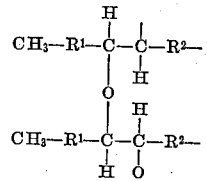

In the polymeric forms the nitriles and amines, wherein the nitrogen is essentially neutral and basic, having the following respective structures:

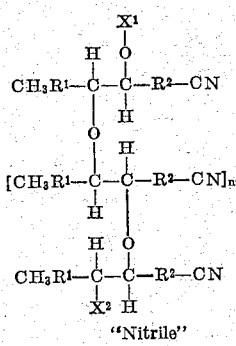

"Nitrile"

and

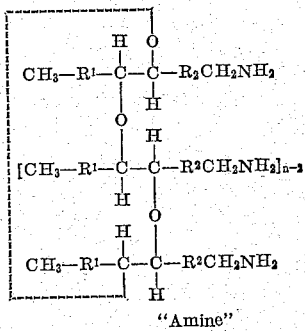

"Amine"

where $R^1$ and $R^2$ are straight or branched chain alkylene groups of 1 to 22 carbon atoms with the sum of the carbon atoms in $R^1$ and $R^2$ preferably not over 22. $X^1$ and $X^2$ are terminal groups which may be H or OH respectively or, in lieu of $X^1$ and $X^2$, the free valences may mutually satisfy each other. The mutually satisfied valances are illustrated alternatively by the broken line shown only in the amine formula. The integer, $n$, is at least 2 and the starting epoxy compound in all instances has the oxirane in other than the 1, 2 position.

Illustratively, the viscous polyether-polynitrile fat derived compounds are obtained, for example, from a polyether-polymer of an epoxy stearic acid ester, as follows:

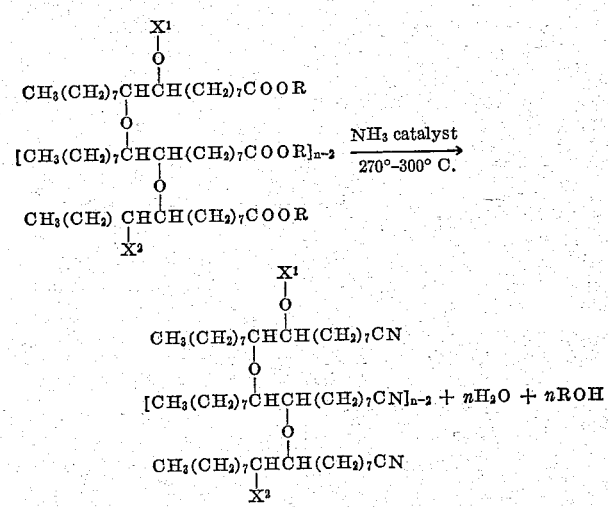

where $n$ is 2 or more, R is a short chain alkyl group from methyl to octyl, and $X^1$ and $X^2$ are terminal groups or mutually satisfied valences as previously defined.

The method for the preparation of the polyether-polynitriles involves the use of ammonia gas and catalyst at elevated temperatures at atmospheric pressure. The polyether-polyacids or their short alkyl chain esters are placed in a reactor equipped with stirrer, suitable condensers, temperature controller and gas inlet tube the exit of which is near the bottom of the reaction mass.

The nitrile forming catalysts are compounds of manganese, cobalt, iron, nickel, lead, zinc, calcium. These metals are preferably in the form of their organic salts or soaps, i.e., formates, acetates, naphthenates, stearates and the like. In some instances the oxides can be used provided they are reactive with fatty acids and fatty esters to form soaps. These oxides are lime, litharge, and zinc oxide.

Another family of nitrile forming catalysts are the metal alcoholates, $A(OR)_4$ where A is titanium, zirconium and hafnium, and R is a short chain alkyl group either straight or branched, from methyl to octyl.

The nitrile forming catalysts are used in the range of .05% to 5.0% metal, with .10% to 4.0% preferred, based on the polyether compound to be converted.

All of the above catalysts are operable in the conversion of polyether-polyesters to polyether-polynitriles, but not all are operable in the conversion of polyether-polyacids to the corresponding nitriles because of gelation difficulties. For example, cobalt acetate causes gelation of polymerized epoxy stearic acid during ammonia reaction. Therefore, we prefer to use the polyether-polyesters rather than the polyether-polyacids to obtain the more positive preparation of the preferred fluid to viscous polyether-polynitrile and polyether-polyamines.

The ammonia can be introduced directly from the storage cylinders or preheated. The quantity can vary from the theoretical to as much as 300% excess. Generally about 100% excess is preferred.

The polyether compound with catalyst is heated to about 90° C. to 100° C. before the ammonia flow is started. The flow is continued until the reaction is considered complete. The reaction is conducted for a period of 5 to 20 hours, or until the appearance of distillate ceases. The temperature over this period varies up to 310° C. The preferred range is 270° to 290° C.

The resultant polyether-polynitrile is recovered from the reaction mixture by dissolving same in an inert solvent, followed by washing and drying. The solvents used are preferably the aromatic hydrocarbons, i.e., benzene, toluene, xylene and their homologues. A ratio from 5 to 0.5 parts solvent volume to one part nitrile volume may be employed. However, a ratio of one to one is preferred.

The solution of product is water washed or washed with dilute acid, and then water, until neutral to litmus. This processing removes the catalyst. The nitrile is recovered in the dry state by conventional solvent removal and drying procedures.

Catalytic reduction of the polyether-polynitrile to the corresponding polyamine can be accomplished with usual hydrogenation catalysts. These include the noble metals and catalytic nickel and cobalt. However, Raney nickel is preferred. The amount of catalyst can vary from 0.1% to 10% but 5% is preferred. Reduction is completed in the presence of ammonia up to a partial pressure of 130 p.s.i. a hydrogen pressure of 500 to 3000 p.s.i. The time of hydrogenation varies with the temperature which is in the range of 100° C. to 200° C. In some instances reduction can be achieved in the presence of a solvent. The polyether-polyamine is recovered by removing the catalyst by filtration followed by inert gas sparge to remove entrained ammonia and solvent if present.

Illustrative examples of the method for obtaining viscous polyether polynitriles and polyether polyamines from specifically bodied and viscous polyether-polyesters prepared according to the aforementioned copending application are described as follows:

*Example 1*

This example illustrates the preparation of a polyether-polynitrile and amine from polyether-polyester product of methyl 9,10-epoxystearate with manganese catalyst.

To 550 parts of the crude polyether-polyester polymer are added 33.6 parts, by weight of manganese naphthenate in mineral spirits solution containing 6% of manganese as metal. This mixture is placed in a reactor connected to a vertical steam jacket condenser fitted to a water cooled condenser and a collection receiver. The mixture was heated in the reactor at 270° C. to 290° C. for a period of about 12 hours while ammonia is bubbled through until no further reaction occurred, as measured by no further distillation of the water and alcohol of reaction.

The reaction mixture was then dissolved in toluene, washed with hot dilute HCl, a number of times with hot water and then stripped of solvent and traces of water by heating the reaction product under reduced pressure of 0.5 mm. of mercury to a temperature of 140° C.

An analysis of the viscous polyether-polynitrile product of the above reaction showed a total nitrogen content of 5.95%.

*Example Ia*

A portion of the above nitrile product, 199 parts, was dissolved in about 200 parts of absolute ethanol. The ethanol solution containing 20 parts of Raney nickel catalyst was reacted with hydrogen in a high pressure rocking autoclave. Before reaction, the air space was flushed a number of times with hydrogen to remove the air. Thereafter ammonia was introduced to a pressure of 130 p.s.i. Next hydrogen was added to a total pressure to 1200 p.s.i. The hydrogenation was then carried out at 100° C. for 7.5 hours. Thereafter the product was removed from the autoclave, filtered to remove the Raney nickel catalyst and sparged with nitrogen, at a temperature of 100° C. and at reduced pressure, for a sufficient time to remove the dissolved ammonia.

An analysis of the product indicated 6.81% of amine nitrogen.

*Example II*

This example illustrates the preparation of nitriles and amines from polymerized butyl epoxy stearate using zinc stearate as a catalyst.

To 560 parts of butyl 9,10-epoxystearate was added 19.5 parts, by weight of zinc stearate containing 10.3% zinc. This mixture was placed in a reactor described in Example I. After the temperature reached about 100° C., ammonia was bubbled through the mixture and then raised over a period of about two hours to about 230° C., at which point the first distillate appeared. The flow of ammonia was continued over the next 16 hours at a temperature between 240° C. and 310° C. The reaction mixture was dissolved in an equal volume of toluene, acidified with hot dilute hydrochloric acid and finally washed several times with hot water. The product was recovered as described in Example I. This product analyzed 5.86% nitrogen and had an acid value 24.5.

This product was hydrogenated with 5% (by weight) Raney nickel as the catalyst and recovered as described in Example I$a$. The partial pressure of ammonia was 130 p.s.i. and a total pressur of hydrogen and ammonia was 2050 to 2400 p.s.i. for 7 hours at 150° C. The product analyzed 3.18% amine nitrogen.

*Example III*

This example illustrates the preparation of nitriles and amines from polymerized butyl 9,10-epoxystearate using calcium naphthenate as a catalyst.

To 560 parts of polymerized butyl epoxy stearate were added 50.3 parts calcium naphthenate containing 4% calcium. The nitrile preparation was carried out as illustrated in Example I. However, the reaction temperature was held at 259° C. to 305° C. for 22 hours. The product was recovered as in Example II. It analyzed 5.26% nitrogen and with an acid value 9.3.

This product was then hydrogenated in the presence of 10% Raney nickel as the catalyst, and recovered by the procedure as indicated in Example I. The ammonia pressure was 130 p.s.i. and hydrogen of pressure 1420 to 1620 p.s.i. was maintained during the hydrogenation. The product analyzed 3.45% amine nitrogen.

The viscous products are particularly useful as corrosion inhibitors, lube oil additives, plasticizers, and as intermediates in the preparation of highly crosslinked polyurethans and polyamides. The nitrile gel products may be useful as insecticidal materials, plasticizers and chemical intermediates.

Having described the present embodiment of our improvement in the art in accordance with the patent statutes, it will be apparent that some modifications and variations as hereinto set forth may be made without departing from the spirit and scope thereof. The specific embodiments described are given by way of examples illustrative of the improvement which is to be limited only by the terms of the appended claims.

We claim:

1. A fluid to viscous polymeric product having the structure:

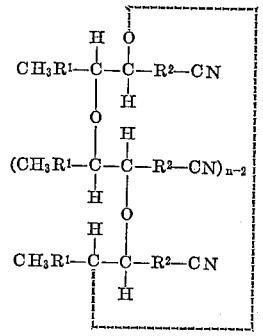

and $R^1$ and $R^2$ are each alkylene groups of 1 to 22 carbon atoms and $n$ is a number of 2 to about 3.

2. A fluid to viscous polymeric product having the structure:

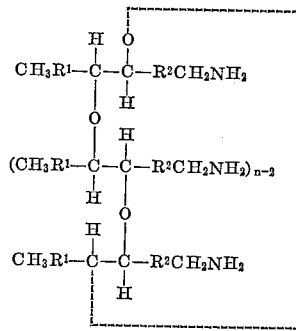

and $R_1$ and $R_2$ are each alkylene groups of 1 to 22 carbon atoms and $n$ is a number of 2 to about 3.

3. A polymeric product having the structure:

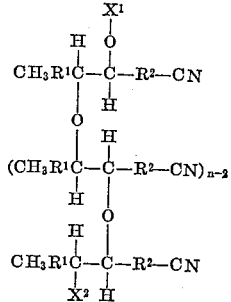

wherein:
$R^1$ and $R^2$ are alkylene groups each having between 1 and 22 carbon atoms with the sum of carbon atoms in $R_1$ and $R_2$ not over 22, $X^1$ and $X^2$ are terminal groups which are H and OH respectively, and $n$ is from 2 to about 3.

4. A polymeric amine product having the structure:

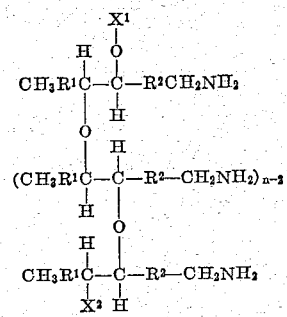

wherein:
R$^1$ and R$^2$ are alkylene groups having between 1 and 22 carbon atoms with the sum of carbon atoms in R$_1$ and R$_2$ not over 22, X$^1$ and X$^2$ are terminal groups which are H and OH respectively, and $n$ is from 2 to about 3.

References Cited in the file of this patent

UNITED STATES PATENTS

| | | |
|---|---|---|
| 2,166,152 | Howk | July 18, 1939 |
| 2,166,183 | Signaigo | July 18, 1939 |
| 2,369,061 | Loder et al. | Feb. 6, 1945 |